(12) United States Patent
Kawashima et al.

(10) Patent No.: US 10,587,785 B2
(45) Date of Patent: Mar. 10, 2020

(54) MONITORING CAMERA AND CONDENSATION SUPPRESSING METHOD

(71) Applicant: PANASONIC I-PRO SENSING SOLUTIONS CO., LTD., Fukuoka (JP)

(72) Inventors: Tomoki Kawashima, Fukuoka (JP); Seiji Urano, Fukuoka (JP); Masahiro Yamashita, Fukuoka (JP); Yoichiro Yamagi, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/256,591

(22) Filed: Jan. 24, 2019

(65) Prior Publication Data

US 2019/0313001 A1   Oct. 10, 2019

(30) Foreign Application Priority Data

Apr. 6, 2018 (JP) ................................. 2018-074005

(51) Int. Cl.
   *G03B 17/08* (2006.01)
   *H04N 5/225* (2006.01)
   *G03B 17/55* (2006.01)

(52) U.S. Cl.
   CPC ......... *H04N 5/22521* (2018.08); *G03B 17/08* (2013.01); *G03B 17/55* (2013.01); *H04N 5/2252* (2013.01); *H04N 5/2254* (2013.01); *H04N 5/2256* (2013.01)

(58) Field of Classification Search
   USPC ........................................................ 348/143
   See application file for complete search history.

(56) References Cited

U.S. PATENT DOCUMENTS

| 2006/0257135 A1 | 11/2006 | Kawada |
| 2009/0214197 A1 | 8/2009 | Kawada |
| 2016/0241762 A1 | 8/2016 | Ono et al. |
| 2017/0104951 A1* | 4/2017 | Wada ...................... H02J 50/10 |

(Continued)

FOREIGN PATENT DOCUMENTS

| JP | 05-031468 U | 4/1993 |
| JP | 2005-215463 A | 8/2005 |
| JP | 2006-319532 A | 11/2006 |

(Continued)

*Primary Examiner* — Behrooz M Senfi
(74) *Attorney, Agent, or Firm* — Greenblum & Bernstein P.L.C.

(57) ABSTRACT

A monitoring camera includes a camera unit that has a lens, a housing that has an opening facing a light incident surface of the lens and surrounds the camera unit with a gap which is formed between the housing and the camera unit, a light-transmissive cover that is attached to the opening with spaced apart from the lens to seal off the housing, a fan that is disposed in the gap and circulates an air in the gap, a ventilation hole that is bored in the housing and causes the gap to be open to an outside, a water-proof air-permeable film that covers the ventilation hole, a heater that is provided facing the gap and heats the air, and an infrared light irradiation device that is provided facing the gap and emits infrared light to the outside through the cover and radiates heat into the air.

7 Claims, 16 Drawing Sheets

(56) References Cited

U.S. PATENT DOCUMENTS

2017/0315427 A1* 11/2017 Nakano ................... G01K 1/14
2017/0331987 A1   11/2017 Kimura

FOREIGN PATENT DOCUMENTS

| JP | 2014-173923 A | 9/2014 |
| JP | 2016-150410 A | 8/2016 |
| JP | 2017-200109 A | 11/2017 |
| JP | 2017-208804 A | 11/2017 |
| JP | 2018-014700 A | 1/2018 |

* cited by examiner

FIG. 16

HEATER AND IR COMBINATION DATA

| IR-LED CURRENT | POWER | 1.5W HEATER | 1.2W HEATER | SUM | |
|---|---|---|---|---|---|
| 448 | 2688 | 0 | 0 | 2688 | |
| 416 | 2496 | 0 | 0 | 2496 | |
| 384 | 2304 | 0 | 0 | 2304 | |
| 352 | 2112 | 0 | 0 | 2112 | |
| 336 | 2016 | 0 | ↓HEATER ON 1200 | 3216 | ↓1.2W HEATER ON |
| | | | ↑HEATER OFF | | ↑1.2W HEATER OFF |
| 320 | 1920 | 0 | 1200 | 3120 | |
| 300 | 1800 | 0 | 1200 | 3000 | |
| 284 | 1704 | 0 | 1200 | 2904 | |
| 268 | 1608 | 0 | 1200 | 2808 | |
| 252 | 1512 | ↓HEATER 0 1500 | ↓HEATER OFF 0 | 3012 | ↓HEATER CHANGE (1.5W-ON, 1.2W-OFF) |
| | | ↑HEATER 0 | ↑HEATER ON | | ↑HEATER CHANGE (1.5W-OFF, 1.2W-ON) |
| 240 | 1440 | 1500 | 0 | 2940 | |
| 220 | 1320 | 1500 | 0 | 2820 | |
| 196 | 1176 | 1500 | 0 | 2676 | |
| 160 | 960 | 1500 | 0 | 2460 | |
| 128 | 768 | 1500 | 0 | 2268 | |
| 110 | 660 | 1500 | ↓HEATER ON 1200 | 3360 | ↓1.2W HEATER ON |
| | | | ↑HEATER OFF | | ↑1.2W HEATER OFF |
| 92 | 552 | 1500 | 1200 | 3252 | |
| 56 | 336 | 1500 | 1200 | 3036 | |
| 20 | 120 | 1500 | 1200 | 2820 | |
| 16 | 96 | 1500 | 1200 | 2796 | |

MONITORING CAMERA AND CONDENSATION SUPPRESSING METHOD

BACKGROUND OF THE INVENTION

1. Field of the Invention

The present disclosure relates to a monitoring camera and a condensation suppressing method of the monitoring camera.

2. Background Art

A monitoring camera designed for possible outdoor installations is required to have hermeticity in order to ensure waterproofness, for example. Therefore, moisture (that is, water vapor) contained in the air present in the housing of the monitoring camera is not likely to move to the outside air, and condensation is likely to occur depending on ambient temperature environment. When the monitoring camera has condensation occurring on a light-transmissive cover provided for protecting a lens, the clarity (that is, visibility) of the captured image deteriorates.

JP-A-2017-200109 discloses an image pickup apparatus including an apparatus main body having a lens unit and a heat generating member provided in an internal space thereof, in which the internal space is divided into a first closed space and a second closed space through an opening, a valve member for opening and closing the opening, a measuring means for measuring the temperature of the internal space, an opening and closing means for opening and closing the valve member, and a control means for controlling the opening and closing action of the valve member by the opening and closing means. This image pickup apparatus can acquire a high clarity image with a simple structure in a short time when driven under a low temperature environment.

However, in the image pickup apparatus of JP-A-2017-200109, the internal space of the camera main body is partitioned into a first closed space and a second closed space. When temperature is dropped such that condensation is likely to occur, the heater is driven to exclusively heat only the first closed space to suppress condensation. On the other hand, if it is necessary to cool the image pickup device, the driving of the heater is stopped and a blowing fan is driven. As a result, air flows between the first closed space and the second closed space, the air in the internal space of the camera main body is mixed, and the heat inside the camera main body is radiated. For this reason, there is room for improvement in that air containing water vapor cannot be discharged from the internal space of the closed camera main body, and condensation cannot be suppressed sufficiently. In addition, suppressing condensation only by driving a heater leads to an increase in running cost.

SUMMARY OF THE INVENTION

The present disclosure has been devised in view of the conventional circumstances described above, and it is an object of the present disclosure to provide a monitoring camera and a condensation suppressing method of the monitoring camera, which can suppress an increase in manufacturing cost and running cost and effectively suppress condensation and icing while effectively utilizing internal heat generation.

The present disclosure provides a monitoring camera including a camera unit that has a lens, a housing that has an opening facing a light incident surface of the lens to support the camera unit and surrounds the camera unit with a gap, the gap formed between the housing and the camera unit, a light-transmissive cover that is attached to the opening with spaced apart from the lens to seal off the housing, a fan that is disposed in the gap and circulates an air in the gap, a ventilation hole that is bored in the housing and causes the gap to be open to an outside, a water-proof air-permeable film that covers the ventilation hole, a heater that is provided facing the gap and heats the air; and an infrared light irradiation device that is provided facing the gap and emits infrared light to the outside through the cover and radiates heat into the air.

The present disclosure also provides a method for suppressing condensation in a monitoring camera. The monitoring camera includes a camera unit that has a lens, a housing that has an opening facing a light incident surface of the lens to support the camera unit and surrounds the camera unit with a gap which is formed between the housing and the camera unit, a light-transmissive cover that is attached to the opening with spaced apart from the lens to seal off the housing, a fan that is disposed in the gap and circulates an air in the gap between the fan and the cover, a ventilation hole that is provided in the housing and causes the gap to be open to an outside, a water-proof air-permeable film that covers the ventilation hole, a heater which is provided facing the gap and heats the air, an infrared light irradiation device which is provided facing the gap and emits infrared light to the outside through the cover and radiates heat into the air, a temperature sensor for measuring a temperature of the air, a controller for controlling activation and stoppage of the fan and the heater based on a measured temperature signal from the temperature sensor and a current value of the infrared light irradiation device. The method includes activating by the controller, the heater and the fan when a temperature measured by the temperature sensor is lower than a predetermined temperature, and stopping by the controller, the heater and the fan when a temperature measured by the temperature sensor is higher than a temperature at a start of a temperature decrease.

According to the present disclosure, it is possible to suppress an increase in manufacturing cost and running cost, and suppress condensation and icing while effectively utilizing internal heat generation.

BRIEF DESCRIPTION OF THE DRAWINGS

FIG. 16 is a diagram showing an example of a heater control table.

DETAILED DESCRIPTION OF THE EXEMPLARY EMBODIMENT

Hereinafter, each embodiment specifically disclosing a monitoring camera and a condensation suppressing method of the monitoring camera according to the present disclosure will be described in detail with reference to the drawings as appropriate.

However, detailed explanation may not be described more than necessary, in some cases.

For example, detailed explanations of already well-known matters and redundant explanation on substantially the same configuration may not be repeated, in some cases. This is to avoid the unnecessary redundancy of the following description and to facilitate understanding by those skilled in the art. It is to be noted that the accompanying drawings and the following description are provided to enable those skilled in the art to sufficiently understand the present disclosure, and are not intended to limit the claimed subject matter.

Embodiment 1

First, a monitoring camera 11 according to Embodiment 1 will be described with reference to FIGS. 1 to 7.

Figure 1:
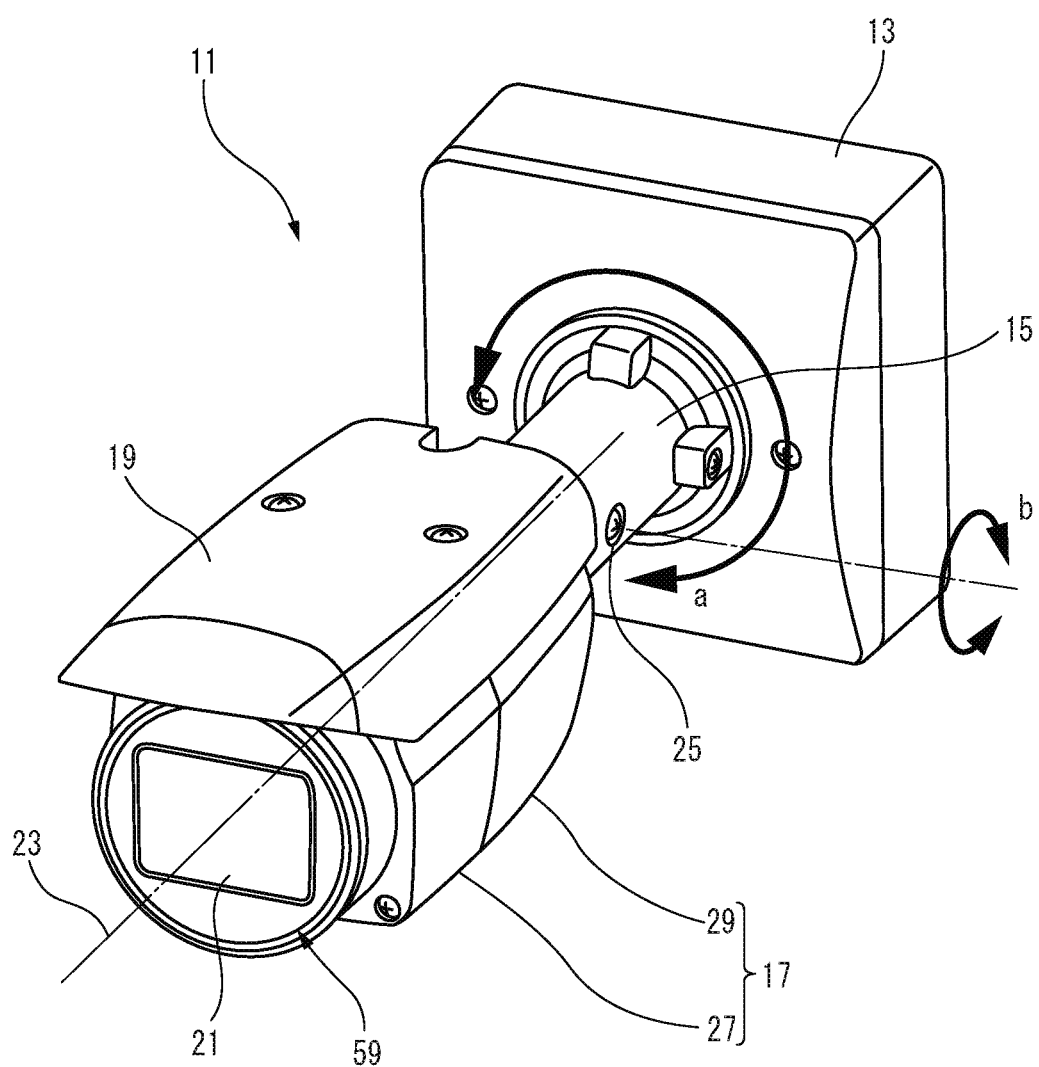
FIG. 1 is a perspective view showing an example of a monitoring camera according to Embodiment 1.

FIG. 1 is a perspective view showing an example of the monitoring camera 11 according to Embodiment 1. The monitoring camera 11 according to Embodiment 1 is a monitoring camera having a so-called box type (that is, a box-shaped) casing. The environment where the monitoring camera 11 is installed is outdoor, for example. The monitoring camera 11 may be installed indoors such as in a factory, a warehouse, or the like.

The monitoring camera 11 with a housing 17 is supported on a base portion 13 through an angle portion 15. In Embodiment 1, the housing 17 is a rectangular parallelepiped, for example. It should be noted that the shape of the housing 17 is not limited to this example only. A sunshade 19 is attached to an upper surface side of the housing 17. A light-transmissive cover 21 is attached to a front surface of the housing 17. The angle portion 15 is capable of pan rotation in both directions in a direction of arrow a about a pan rotation axis center 23 with respect to the base portion 13. In addition, the housing 17 is tilt-rotatable in both directions in a direction of arrow b about a tilt axis 25 with respect to the base portion 13.

Figure 2:
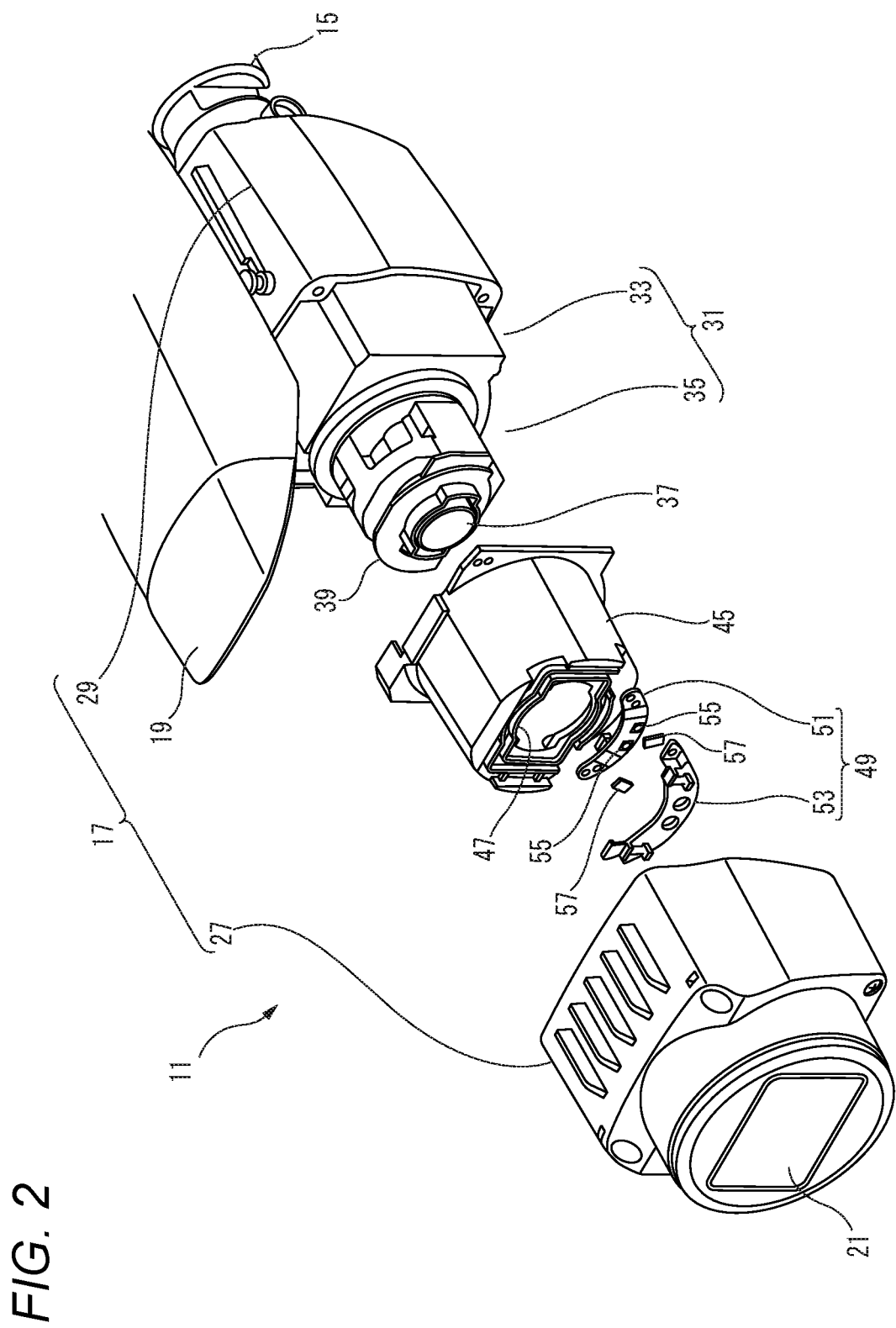
FIG. 2 is an exploded perspective view of the monitoring camera shown in FIG. 1.

FIG. 2 is an exploded perspective view of the monitoring camera 11 shown in FIG. 1. The housing 17 has a front case 27 to which the cover 21 is to be attached later, and a main body case 29 to which the angle portion 15 is attached.

A rear portion of the camera unit 31 is accommodated in the main body case 29. The camera unit 31 has a camera main body 33 and a lens unit 35. The lens unit 35 has a lens 37 on distal end surface thereof. The lens unit 35 is attached with an arc-shaped heater substrate 39 at a front end surface where the lens 37 is exposed, surrounding substantially an upper half of the lens 37. A heater (not shown) is mounted on the heater substrate 39. The heater has a first heater 41 and a second heater 43 (see FIG. 14), each of which can be independently driven.

A lens cover 45 is attached to the camera main body 33 to cover the lens unit 35. The lens cover 45 attached to the camera main body 33 is inserted into the front case 27. A lens exposure opening 47 for exposing the lens 37 is formed on the front end surface of the lens cover 45. An infrared light irradiation device 49 is attached to the front end surface of the lens cover 45 to extend along an outer periphery of the lens 37 exposed in the lens exposure opening 47.

The infrared light irradiation device 49 has an arc-shaped infrared ray (IR)-light emitting diode (LED) substrate 51 extending along the outer periphery of the lens 37 and an IR-LED cover 53 covering a part of the IR-LED substrate 51. A plurality of IR-LEDs 55 (for example, two in Embodiment 1) are mounted on the IR-LED substrate 51. The IR-LED cover 53 has an LED window unit formed to expose the IR-LED 55. The IR-LED cover 53 is formed of a metal having a high thermal conductivity (e.g., aluminum or copper). The IR-LED cover 53 is fixed to the IR-LED substrate 51 through a heat conduction sheet 57. As a result, the IR-LED substrate 51 can efficiently dissipate heat generated by driving of the IR-LED 55 from the IR-LED cover 53 to ambient air. The IR-LED cover 53 is disposed to face an inner surface of the cover 21 attached to the front case 27.

Figure 3:
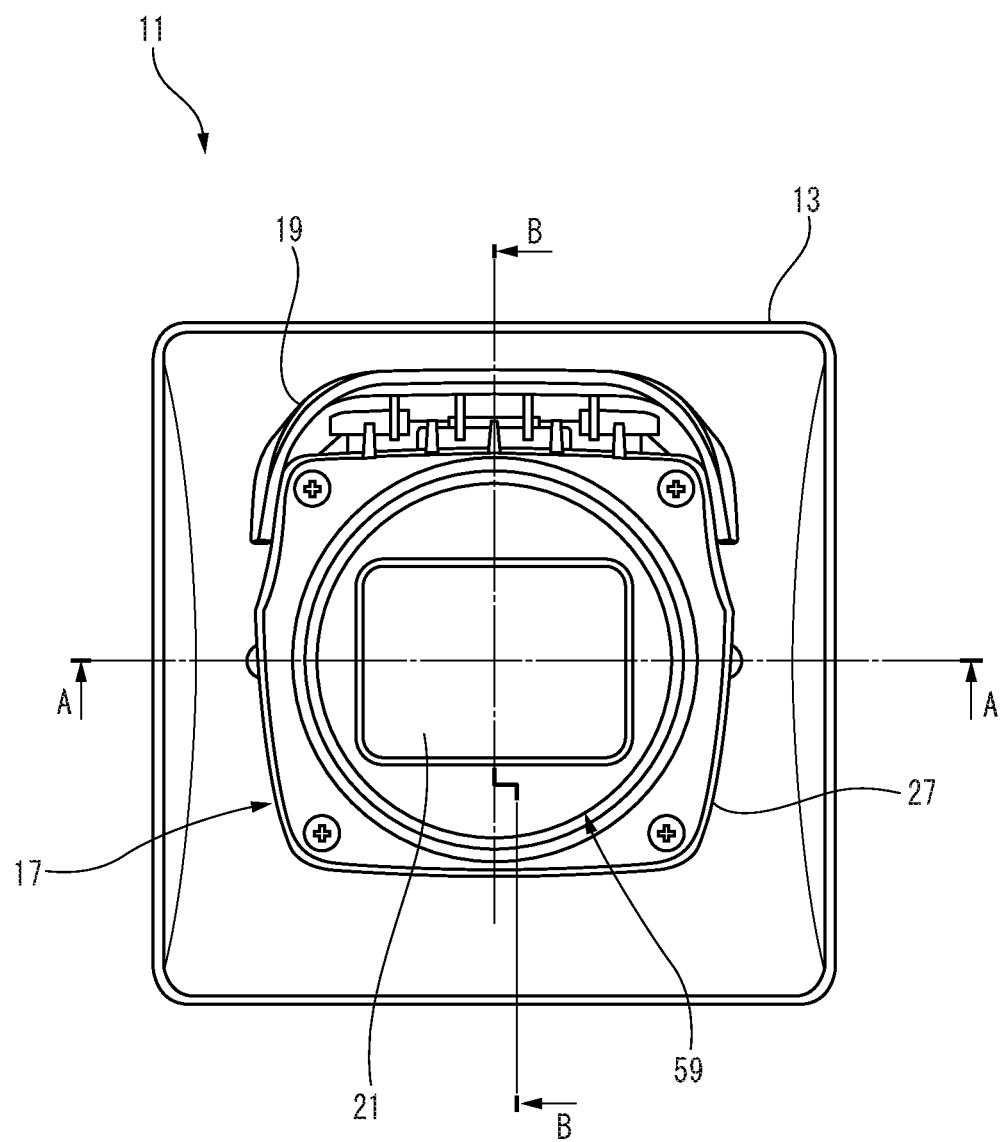
FIG. 3 is a front view of the monitoring camera shown in FIG. 1.

FIG. 3 is a front view of the monitoring camera 11 shown in FIG. 1. The front case 27 is substantially square when seen in a front view. The cover 21 is disposed in a center portion of the front end surface of the front case 27. The cover 21 is attached to the opening 59 of the front case 27 while being spaced apart from the lens 37. The housing 17 has an internal space open in the opening 59. The cover 21 seals off the housing 17 by being attached to the opening 59. The cover 21, being light-transmissive, allows an object light from a subject to be transmitted therethrough and fell incident on the lens 37. The opening 59 is disposed to face a light incident surface of the lens 37.

For the cover 21, a resin material having excellent moldability and transparency can be used as a substrate material. The resin material includes an organic resin material and an inorganic resin material. In Embodiment 1, an organic resin material such as polycarbonate is used as the substrate material of the cover 21. Polycarbonate is suitable because it is hard and resistant to impact. In addition, a resin having good transparency such as acrylic can also be used for the cover 21.

Figure 4:
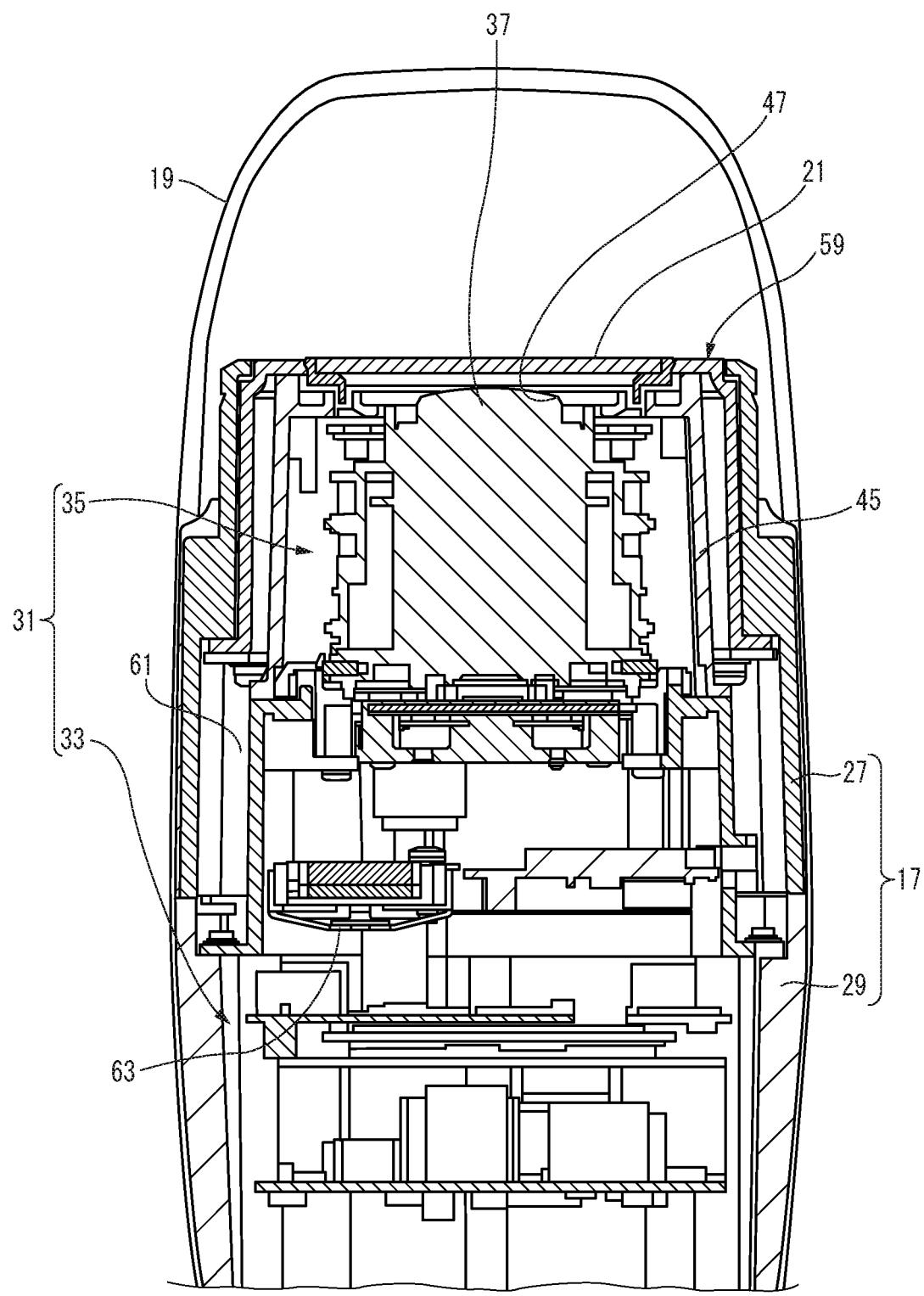
FIG. 4 is a sectional view taken along the line A-A of FIG. 3.

FIG. 4 is a sectional view taken along the line A-A in FIG. 3. The housing 17 covers the camera unit 31. The housing 17 has an opening 59 coinciding with the lens 37 to support the camera unit 31 and surrounds the camera unit 31 while having a gap 61 therebetween. The camera unit 31 is provided with a fan 63 as an example of a blower. In Embodiment 1, the fan 63 serves as an axial fan in which a fan blade is rotated by a motor (not shown). The fan 63 is disposed in the gap 61 and circulates air in the gap 61 between the fan 63 and the cover 21. It is to be noted that the structure of the fan 63 is not limited to this, and it may be a sirocco fan or the like that blows in a direction orthogonal to an axis of rotation.

Figure 5:
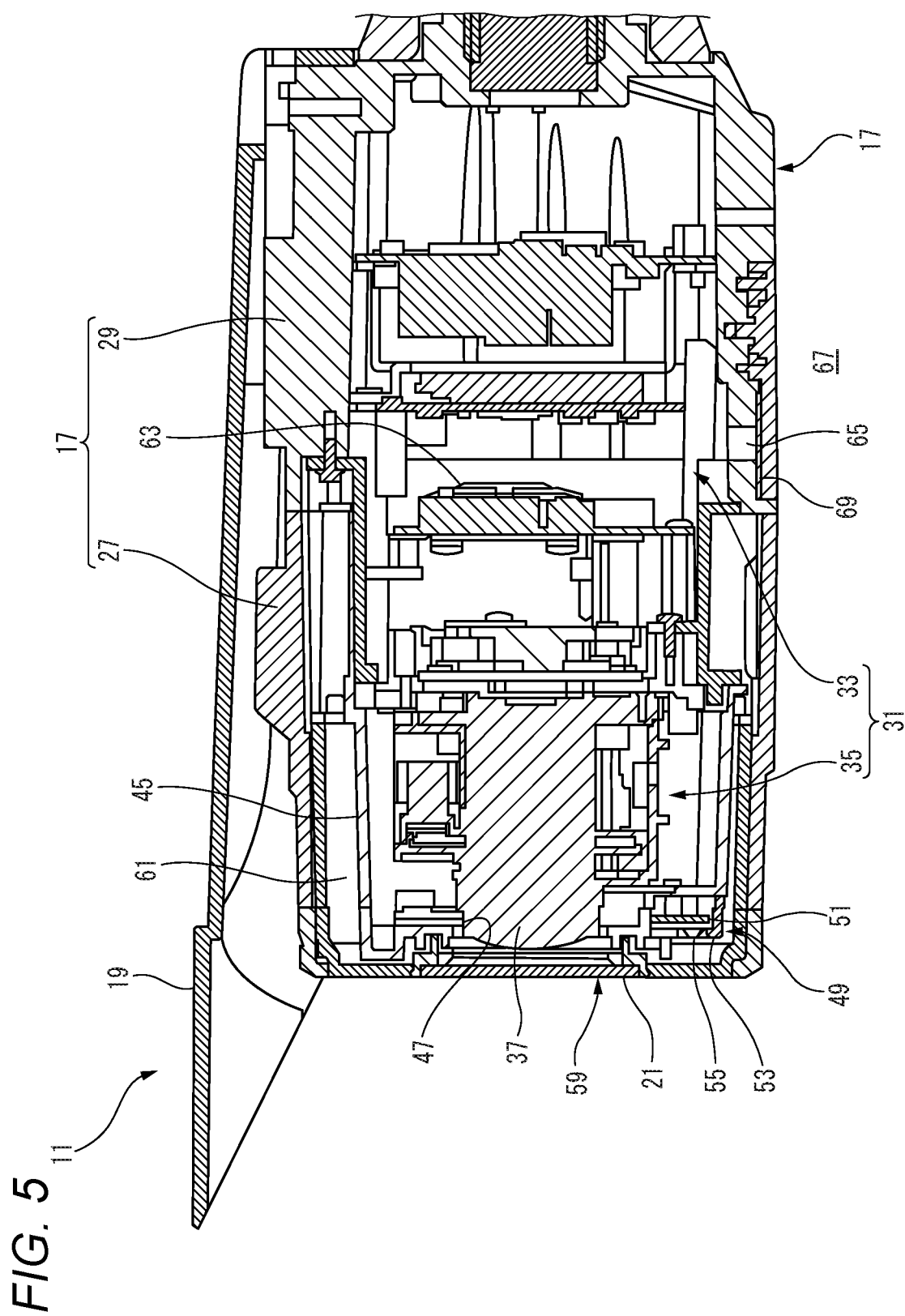
FIG. 5 is a sectional view taken along the line B-B of FIG. 3.

FIG. 5 is a sectional view taken along line B-B of FIG. 3. A ventilation hole 65 is bored in the housing 17. The ventilation hole 65 causes the gap 61 to be open to the outside 67. In Embodiment 1, the ventilation hole 65 is disposed on a lower surface side of the main body case 29 constituting the housing 17. The ventilation hole 65 is disposed on a blowout side of the fan 63.

Figure 6:
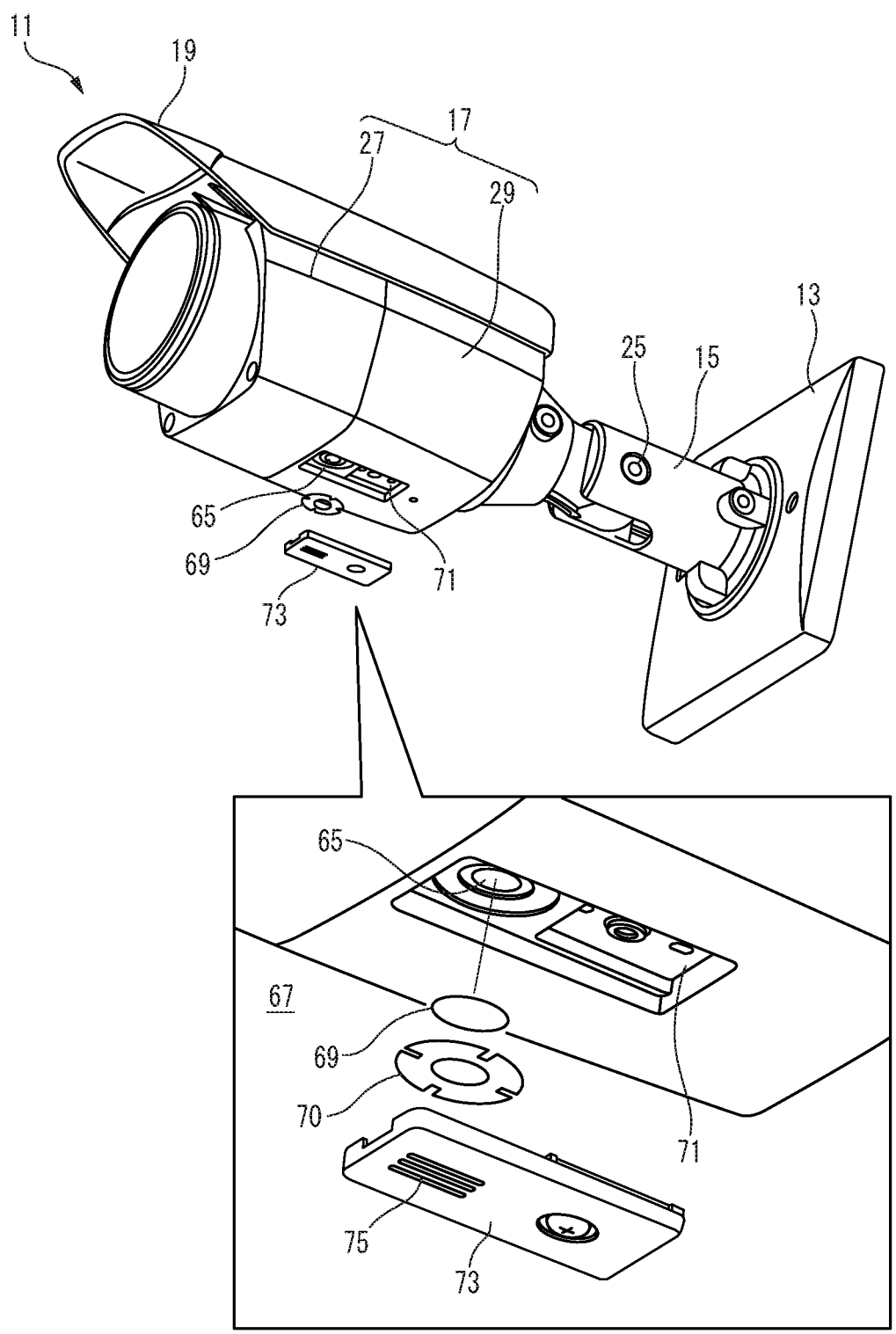
FIG. 6 is a perspective view showing a laminating structure of a water-proof air-permeable film in the monitoring camera of FIG. 1, together with an enlarged view of a main part thereof.

FIG. 6 is a perspective view showing a laminating structure of a water-proof air-permeable film 69 in the monitoring camera 11 of FIG. 1, together with an enlarged view of a main part thereof. The ventilation hole 65 is closed by the water-proof air-permeable film 69. The water-proof air-permeable film 69 does not permit water to pass through, but permits air to pass through. The air that passes through the water-proof air-permeable film 69 contains water vapor. That is, the water-proof air-permeable film 69 permits water molecules to pass through. After being pasted to the ventilation hole 65, the water-proof air-permeable film 69 is pasted with a protective sheet 70 having a circular central opening. The opening diameter of the protective sheet 70 coincides or substantially coincides with the diameter of the ventilation hole 65. The ventilation hole 65 is formed in a circular shape, for example. The ventilation hole 65 is opened at a bottom of a film attachment recess 71 recessed on an outer surface of the housing 17. The water-proof air-permeable film 69 is disposed in the same, or substantially the same diameter as the ventilation hole 65 opened at the bottom of the film attachment recess 71, and the water-proof air-permeable film 69 is prevented from peeling off by the protective sheet 70 having an open center that is pasted thereto. The water-proof air-permeable film 69 disposed in the film attachment recess 71 is protected by a cover plate 73 mounted in the film attachment recess 71. A ventilation slit 75 is formed in the cover plate 73.

Figure 7:
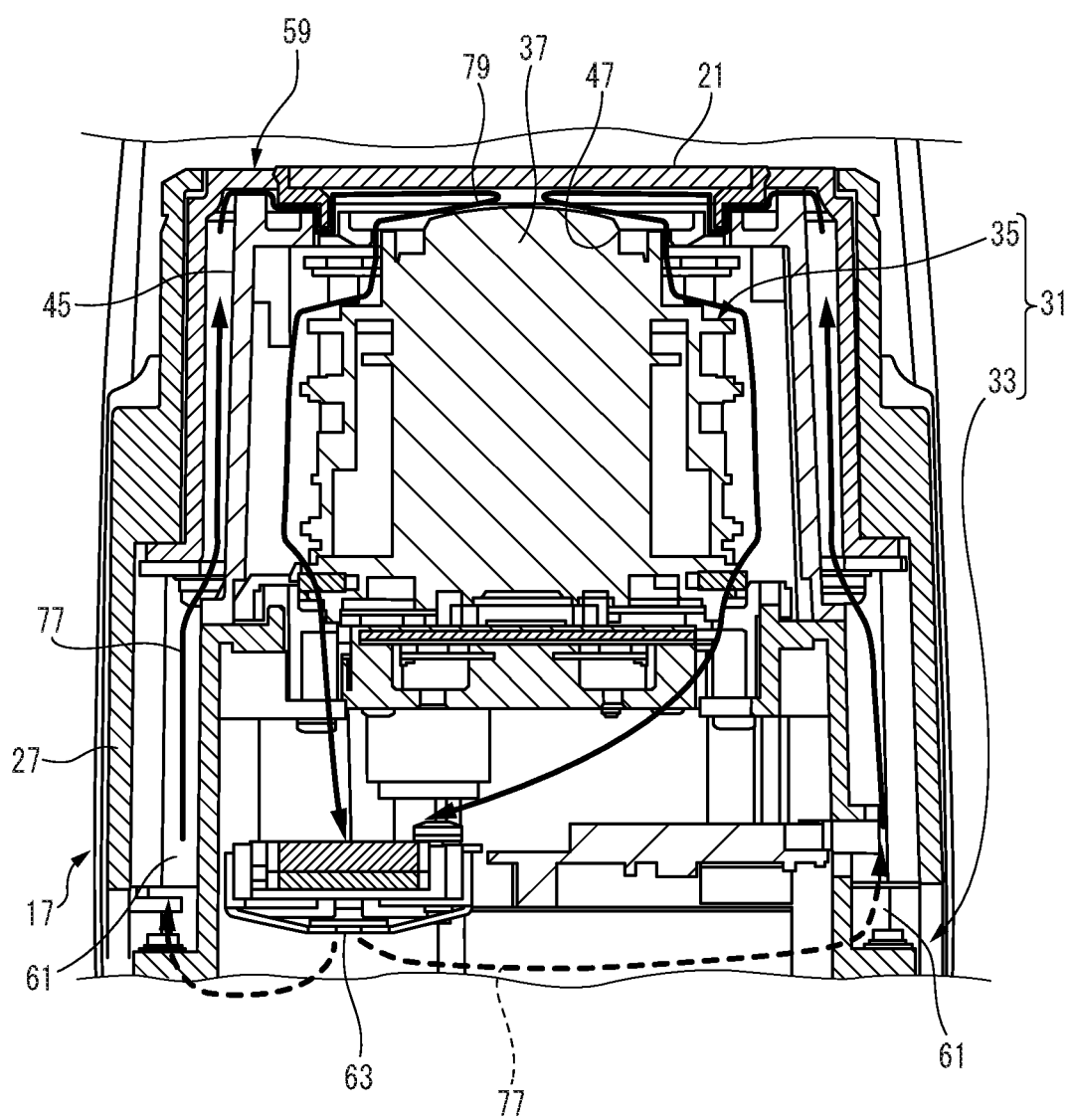
FIG. 7 is an enlarged view of a main part of FIG. 4, showing a flow path of air containing water vapor.

FIG. 7 is an enlarged view of a main part of FIG. 4 showing a flow path of air containing water vapor. In the monitoring camera 11, when the fan 63 is driven, the air in the gap 61 circulates between the fan 63 and the cover 21 in a direction indicated by the arrow in FIG. 7. The air blown out from the fan 63 flows toward the cover 21 through the gap 61 serving as a flow path and flows along the inner surface of the cover 21 and then returns to the inlet side of the fan 63 through the other gap 61. Here, the flow path may not be particularly like the flow path shown in FIG. 7. However, it is preferable that the air is blown out from the fan 63 and brought into contact with the inner surface of the cover 21, and then returned to the fan 63 in a reflux manner. In other words, on the inner surface of the cover 21, there is no stagnation region of the air that is isolated from the air flow (so-called "circulation" 77). The main flow of the circulation 77 may not flow on the inner surface of the cover 21 as long as the branch flow 79 flows.

Embodiment 2

Next, a monitoring camera 81 according to Embodiment 2 will be described with reference to FIGS. 8 to 13.

Figure 8:
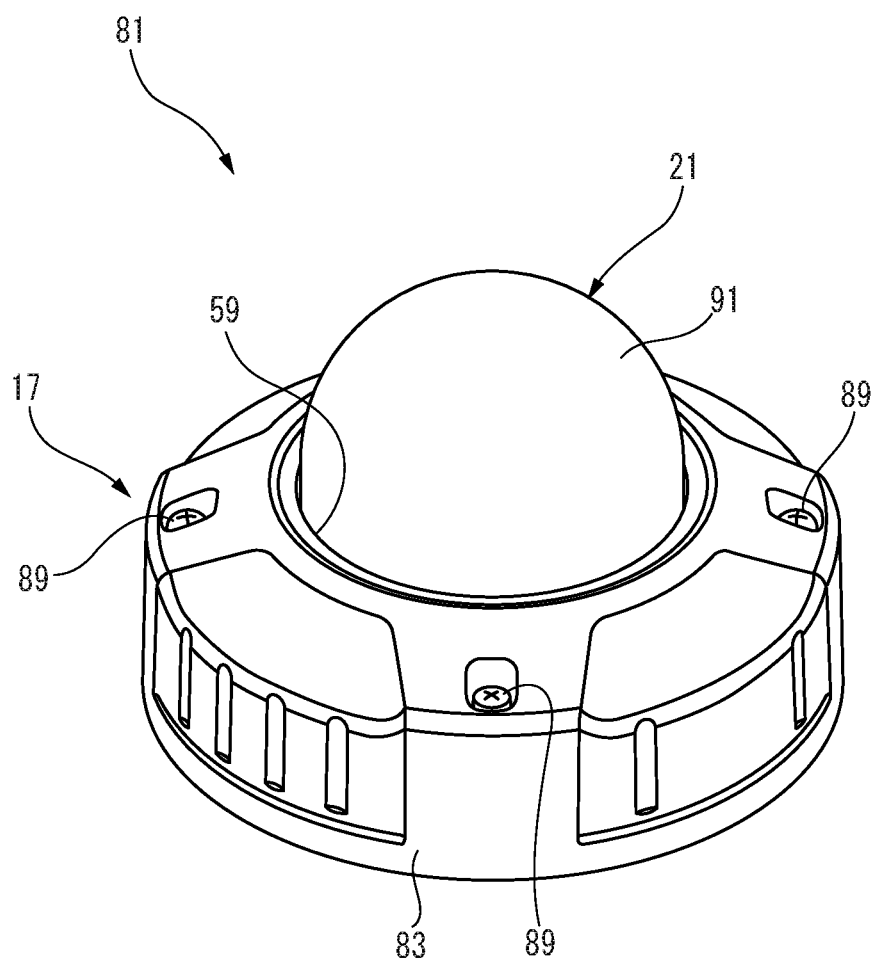
FIG. 8 is a perspective view showing an example of a monitoring camera according to Embodiment 2.

FIG. 8 is a perspective view showing an example of the monitoring camera 81 according to Embodiment 2. In Embodiment 2, the same reference numerals are given to the equivalent members and equivalent parts as those shown in Embodiment 1, and redundant description is not repeated.

The monitoring camera 81 according to Embodiment 2 is a monitoring camera having a so-called dome type housing. The environment where the monitoring camera 81 is installed is outdoor, for example. The monitoring camera 81 may be installed indoors such as in a factory, a warehouse, or the like.

The monitoring camera 81 has a housing 17 and a cover 21.

Figure 11:
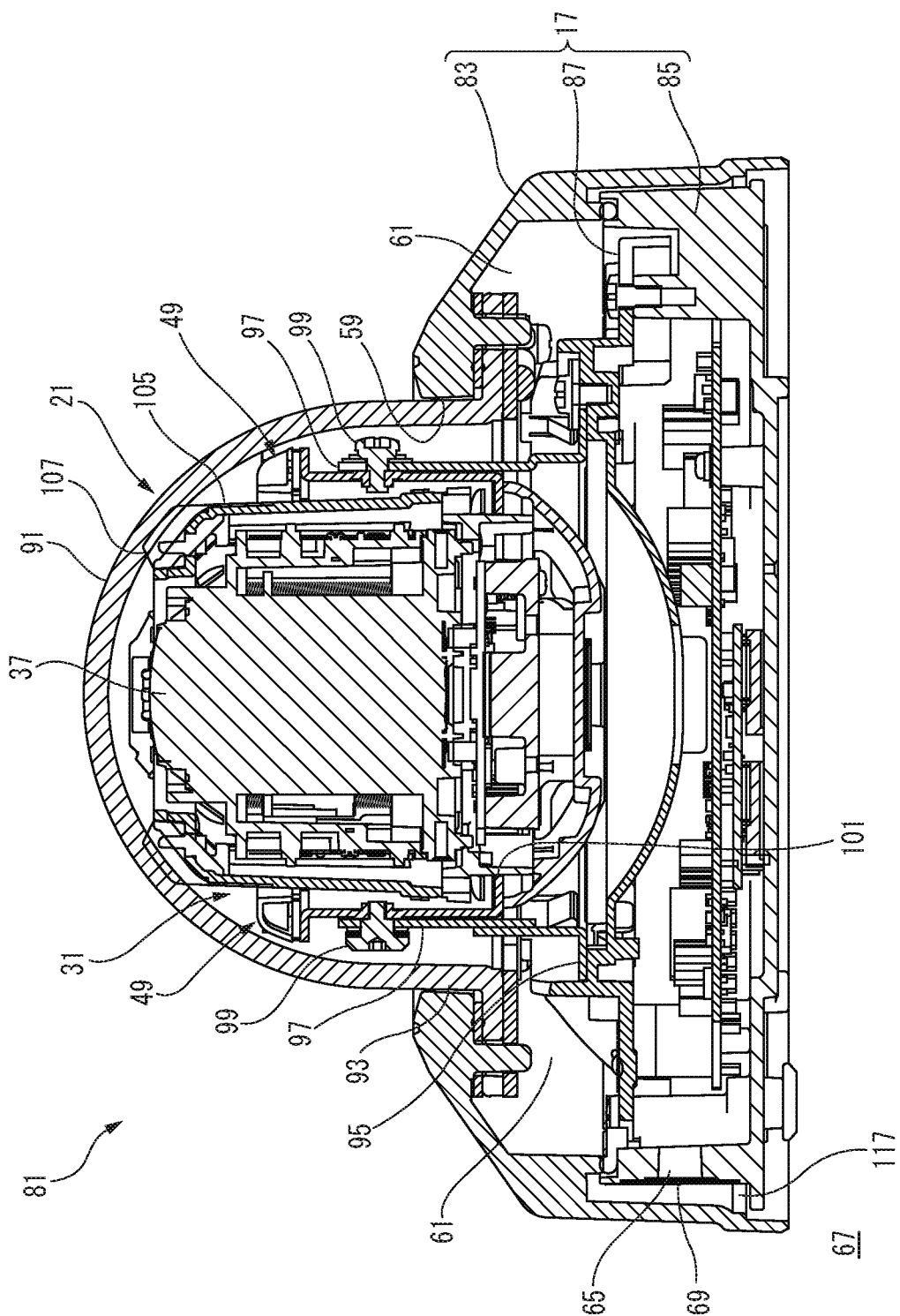
FIG. 11 is a sectional view taken along the line C-C of FIG. 10.

In Embodiment 2, the housing 17 is composed of a dome case 83, a main body case 85 (see FIG. 11), and an inner case 87 (see FIG. 11). The dome case 83 is attached to the main body case 85 by a plurality of fixing screws 89. The inner case 87 is secured to the main body case 85 by fixing screws (not shown). The camera unit 31 (see FIG. 9) is supported by the inner case 87.

For example, the monitoring camera 81 is attached to a ceiling, a wall, a support pole for a monitoring camera, or the like through a mounting bracket (not shown). The camera unit 31 is secured with respect to the inner case 87 in a desired direction in a pan rotation direction around a center of pan rotation. The direction of pan rotation is the rotation direction around a center axis of the pan rotation perpendicular to a ceiling surface or a wall surface to which the monitoring camera 81 is attached, for example. In addition, a direction of tilt rotation described below is a rotation direction around a tilt axis in a direction perpendicular to the center axis of the pan rotation.

In Embodiment 2, the cover 21 is formed in a dome shape having a hemispherical portion 91 and a cylindrical straight portion 93 continued from an edge of an opening of the hemispherical portion 91. The dome case 83 is formed in an annular shape into which the hemispherical portion 91 of the cover 21 is inserted. As the material of the cover 21, the same material as that of Embodiment 1 can be used.

Figure 9:
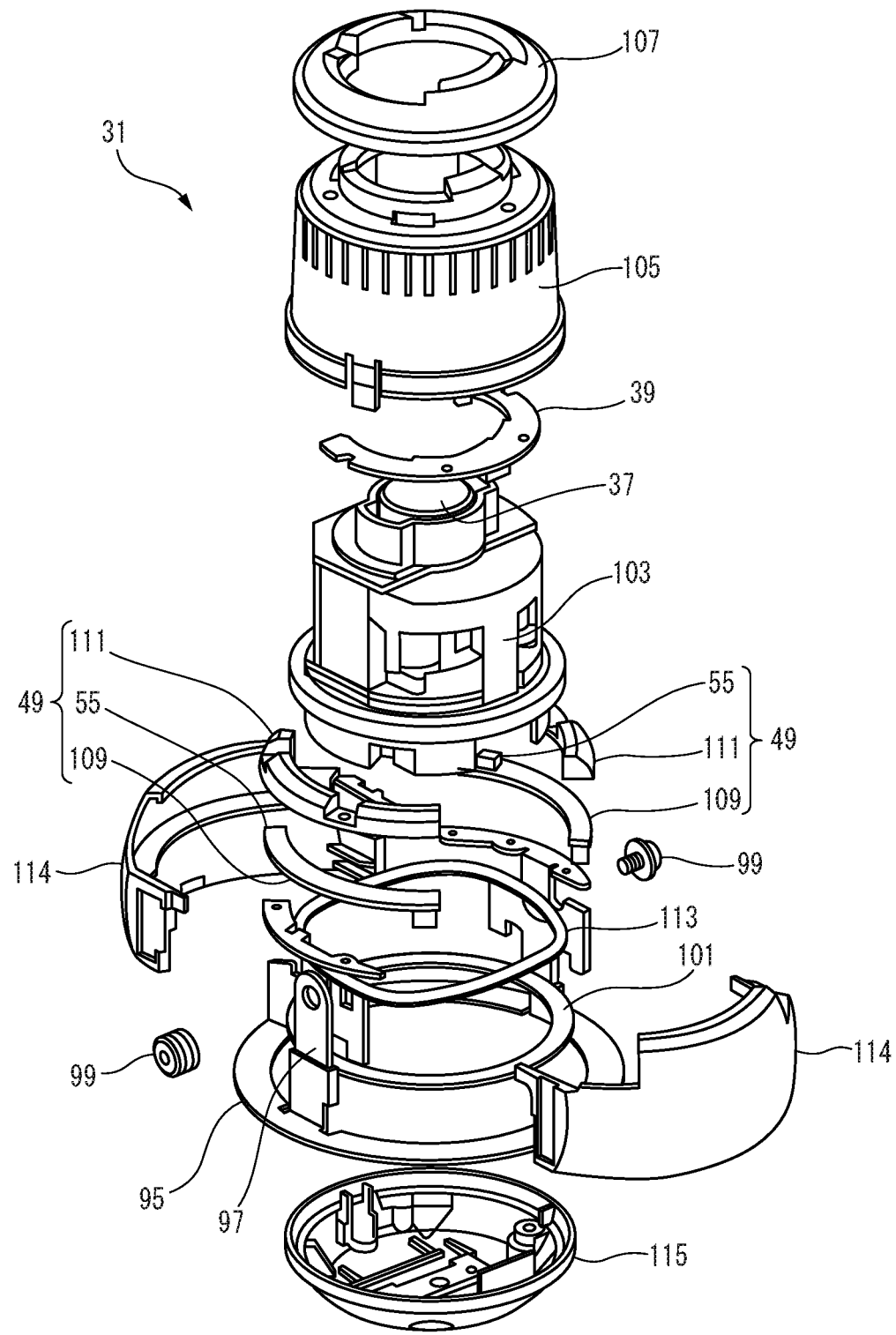
FIG. 9 is an exploded perspective view of the monitoring camera shown in FIG. 8.

FIG. 9 is an exploded perspective view of the monitoring camera 81 shown in FIG. 8. The camera unit 31 has an annular plate-shaped pan angle 95 supported rotatably by the inner case 87 in the direction of pan rotation. On the pan angle 95, a pair of tilt arms 97 is formed to stand upright. The pan angle 95 rotatably supports a tilt angle 101 formed in an annular plate shape with a smaller diameter than the pan angle 95, in the direction of tilt rotation with tilt fixing screws 99 through the pair of tilt arms 97. The lens unit 103 is secured to the tilt angle 101.

A lens 37 is provided on the front end surface of the lens unit 103. An arc-shaped heater substrate 39 is attached to the front end surface of the lens unit 103 along the outer periphery of the lens 37. A heater is mounted on the heater substrate 39. Likewise Embodiment 1, the heater has a first heater 41 and a second heater 43 (see FIG. 14) which can be independently driven. A lens cover 105 is attached to the lens unit 103 to cover the heater substrate 39. A ring-shaped light shielding rubber 107 is mounted on the front end surface of the lens cover 105. The light shielding rubber 107 is brought into close contact with the inner surface of the cover 21 (see FIG. 11).

An infrared light irradiation device 49 is attached to the tilt angle 101. The infrared light irradiation device 49 has a pair of IR-LED substrates 109 formed in an arc shape and a pair of IR-LED covers 111 attached to the respective IR-LED substrates 109. The IR-LED substrates 109 are centered around the center of the tilt angle 101 formed in an annular shape. The IR-LED cover 111 covers and mounts the IR-LED substrates 109 by exposing the IR-LEDs 55 provided on the IR-LED substrate 109. The side surface of the lens unit 103 is covered with a pair of side covers 114. A bottom cover 115 is attached to the rear end surface of the lens unit 103 opposite to the lens 37 through an annular wave washer 113 so that it can also rotate in the direction of yaw rotation.

Figure 10:
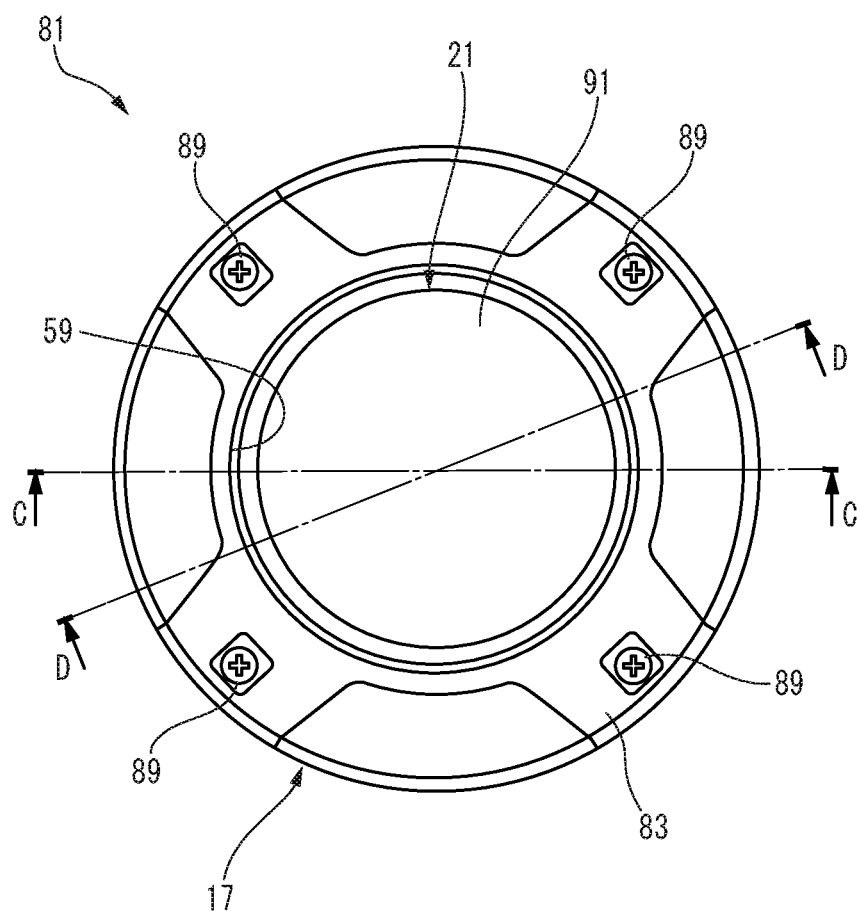
FIG. 10 is a front view of the monitoring camera shown in FIG. 8.

FIG. 10 is a front view of the monitoring camera 81 shown in FIG. 8. In the monitoring camera 81 accommodating the lens unit 103, the circular dome case 83 and the cover 21 are arranged concentrically when seen in a plan view. The cover 21 is attached to an opening 59 that is opened at the center portion of the dome case 83. The cover 21 attached to the opening 59 closes the housing 17 at the dome case 83 and the main body case 85. The hemispherical dome-shaped cover 21 has a radius of approximately half the radius of the monitoring camera 81 and is elevated at the central portion of the housing 17 to cover the camera unit 31.

FIG. 11 is a sectional view taken along the line C-C in FIG. 10. In the housing 17, the inner case 87 supports the camera unit 31, and the dome case 83 surrounds the camera unit 31 while having a gap 61 therebetween. In the housing 17, a ventilation hole 65 is bored in the inner case 87. The ventilation hole 65 causes the gap 61 to be open to the outside 67. In the present embodiment, the ventilation hole 65 is disposed on a side surface side of the main body case 85 constituting the housing 17. The ventilation hole 65 opened on the side surface side of the main body case 85 is covered with a dome case 83 disposed while having a gap 117. The ventilation hole 65 is in communication with the outside 67 through this gap 117.

The ventilation hole 65 of the inner case 87 is closed by a water-proof air-permeable film 69 similar to that described above.

Figure 12:
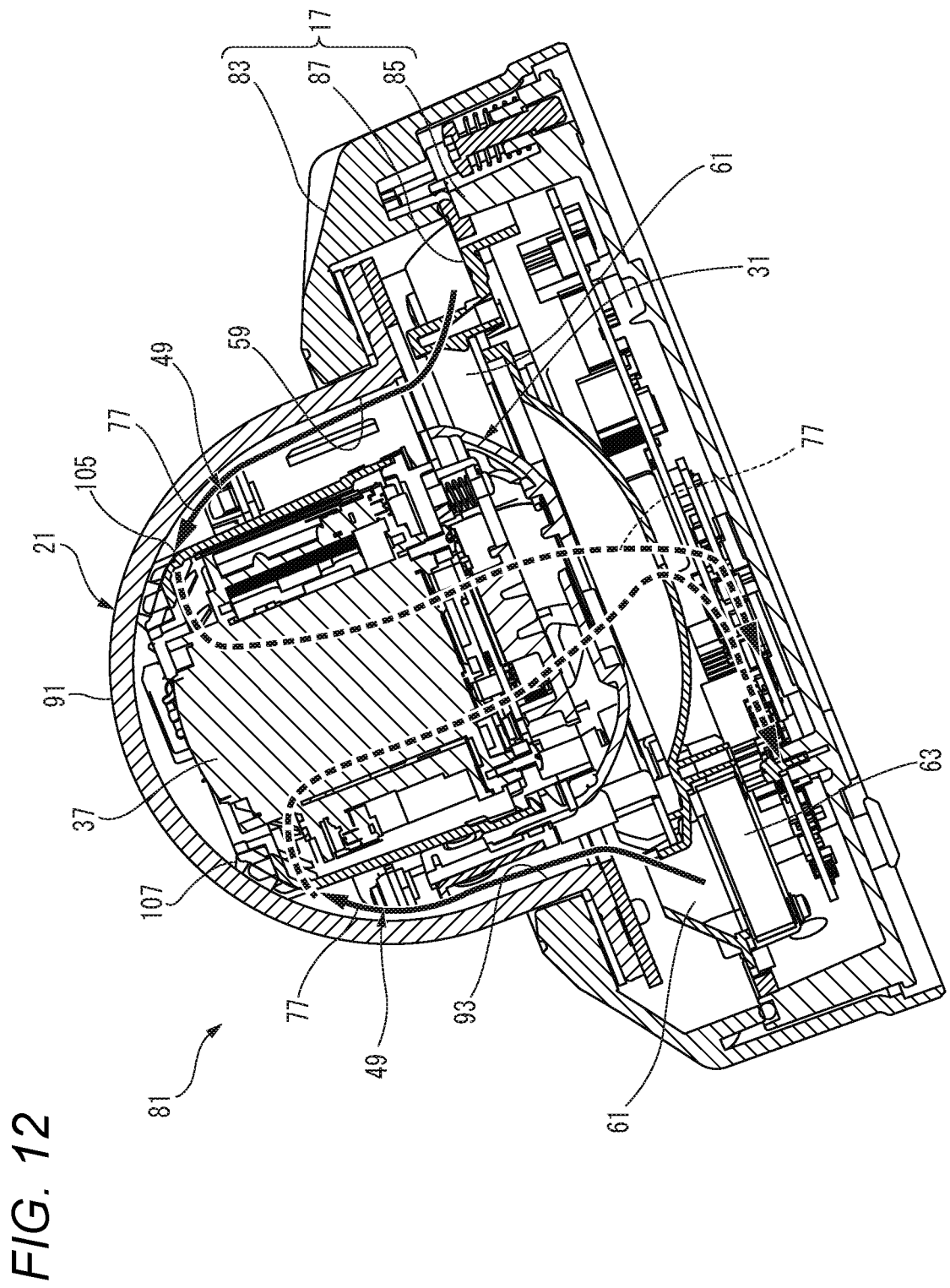
FIG. 12 is a sectional view taken along the line D-D of FIG. 10.

FIG. 12 is a sectional view taken along the line D-D in FIG. 10. The inner case 87 includes a fan 63 as a blower. In the present embodiment, the fan 63 is an axial fan in which a fan blade is rotated by a motor. The fan 63 is disposed in the gap 61 and circulates air in the gap 61 between the fan 63 and the cover 21.

Figure 13:
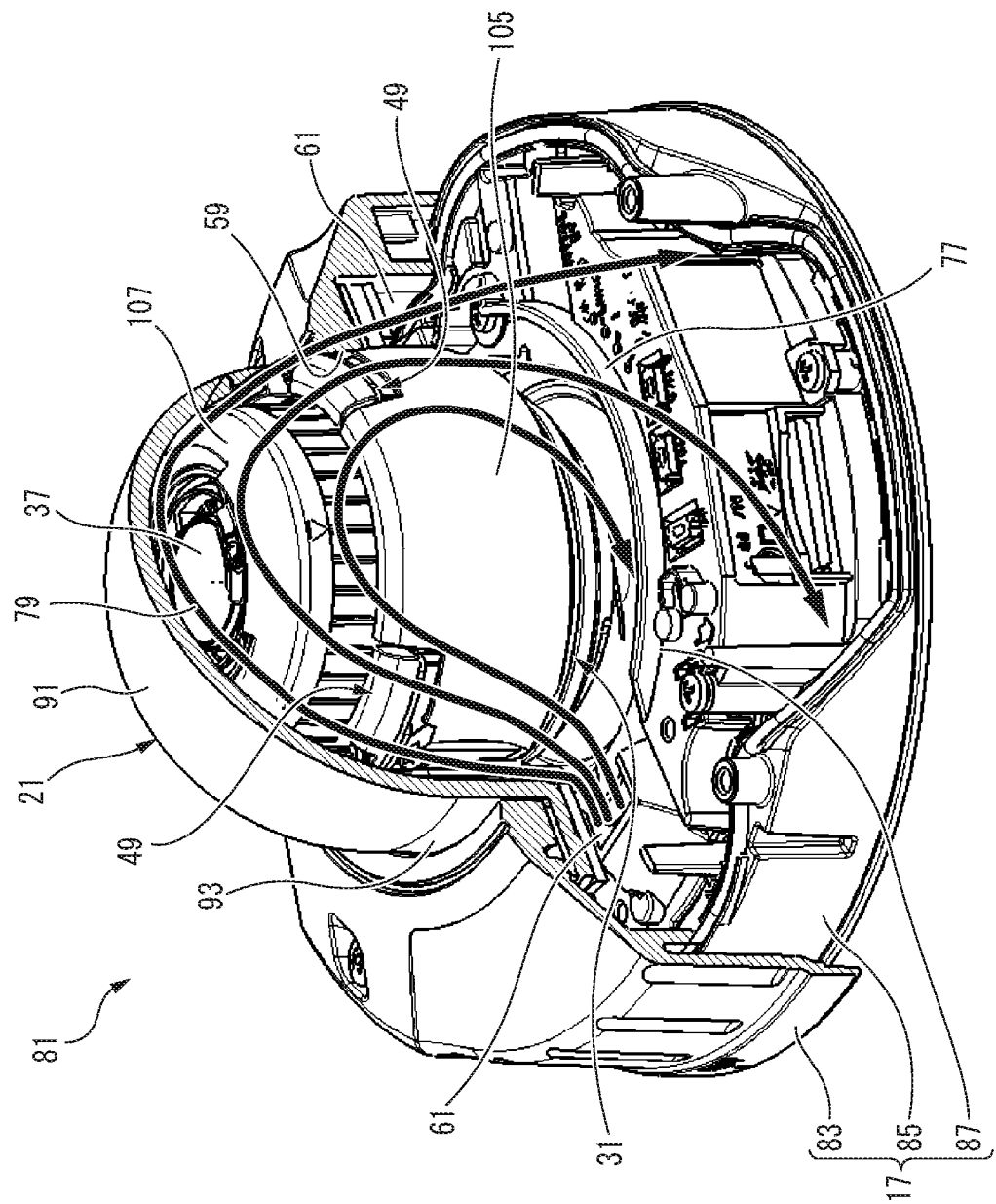
FIG. 13 is a partially cutaway perspective view showing the flow path of air of FIG. 8.

FIG. 13 is a partially cutaway perspective view showing the flow path of air of FIG. 8. In the monitoring camera 81, when the fan 63 is driven, the air in the gap 61 circulates between the fan 63 and the cover 21 in a direction indicated by the arrow in FIG. 13. The air blown out from the fan 63 flows toward the cover 21 through the gap 61 serving as a flow path and flows along the inner surface of the cover 21 and then returns to the inlet side of the fan 63 through the other gap 61. Here, the flow path may not be strictly specified. However, it is a requirement that the air is blown out from the fan 63 and brought into contact with the inner surface of the cover 21, and then returned to the fan 63 in a reflux manner. In other words, on the inner surface of the cover 21, there is no stagnation region of air that is isolated from the air flow (so-called "circulation"). The main flow of the circulation 77 may not flow on the inner surface of the cover 21, as long as the branch flow 79 flows.

Next, the main internal configuration of the monitoring cameras 11 and 81 according to Embodiments 1 and 2 will be described with reference to FIG. 14.

Figure 14:
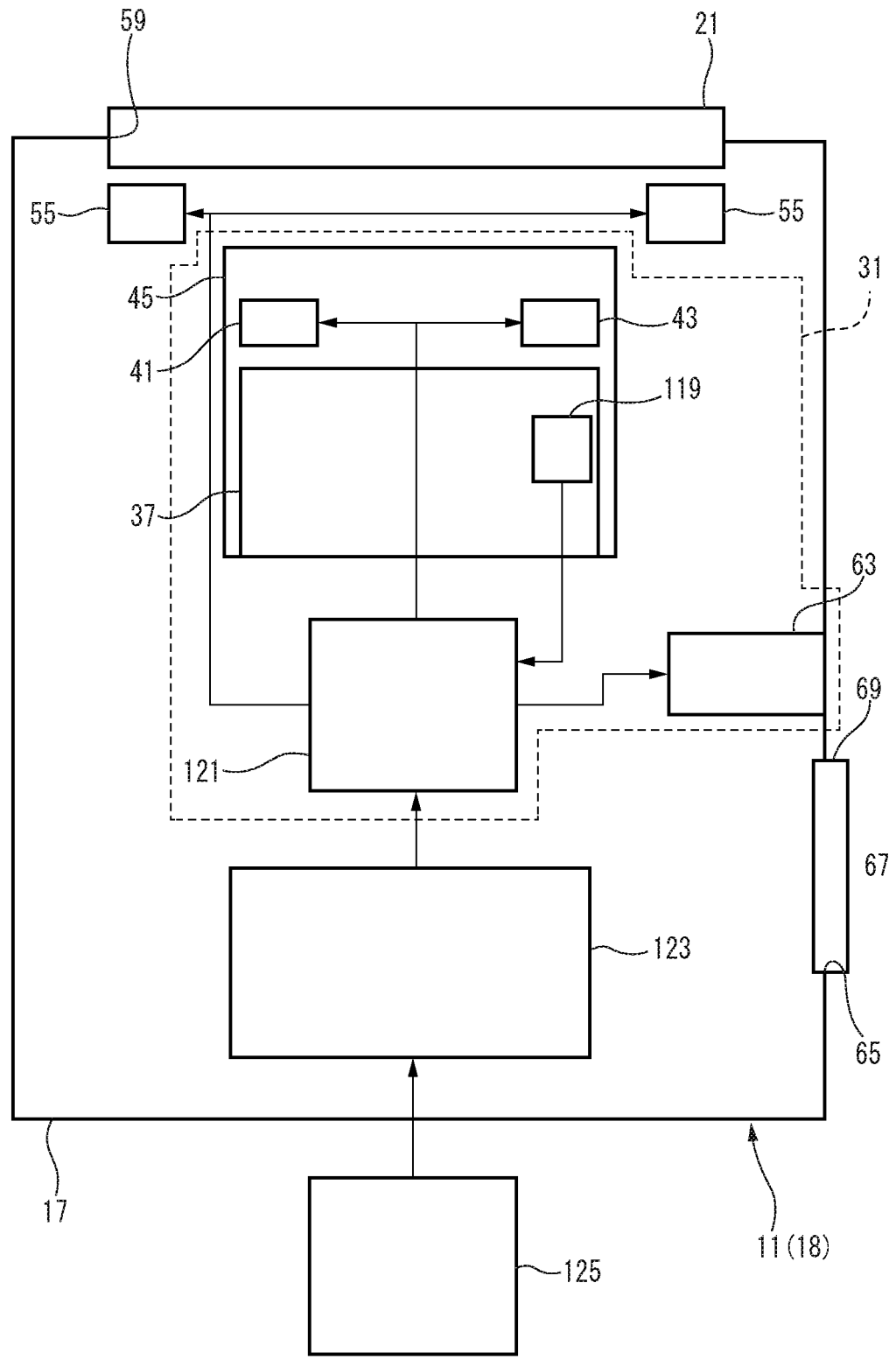
FIG. 14 is a block diagram showing an example of a main internal configuration of the monitoring camera according to Embodiments 1 and 2.

FIG. 14 is a block diagram showing an example of the main internal configuration of the monitoring cameras 11 and 81 according to Embodiments 1 and 2. Each of the monitoring cameras 11 and 81 has a camera unit 31, a housing 17, a cover 21, a fan 63, a ventilation hole 65, a water-proof air-permeable film 69, a heater, and an IR-LED 55 as main basic components.

Further, the monitoring camera 11 and the monitoring camera 81 have a temperature sensor 119 for measuring the temperature of the air and a controller 121 as main components. The controller 121 individually controls the fan 63 and the heater to operate and stop based on the measured temperature signal from the temperature sensor 119 and the current value of the IR-LED 55.

In the monitoring cameras 11 and 81, as described above, the heater has the first heater 41, and the second heater 43 that generates a smaller amount of heat than the first heater 41. The controller 121 individually controls the first heater 41 and the second heater 43 to operate and stop.

In the monitoring cameras 11 and 81, the first heater 41 and the second heater 43 are disposed on a downstream side of the IR-LED 55 in the flow path of air flowing from the fan 63 to the cover 21.

In addition, the monitoring camera 11 and the monitoring camera 81 are provided with a Power over Ethernet (PoE) (registered trademark) power supply 123. A power supply 125 is supplied to the PoE power supply 123 through a Local Area Network (LAN) cable or the like connected to the monitoring cameras 11 and 81. It is to be noted that the power supply 125 may be other than the PoE, such as 12V Direct Current (DC), for example.

Next, a condensation suppressing method of the configurations of both the monitoring cameras 11 and 81 according to Embodiments 1 and 2 will be described with reference to FIGS. 15 and 16.

Figure 15:
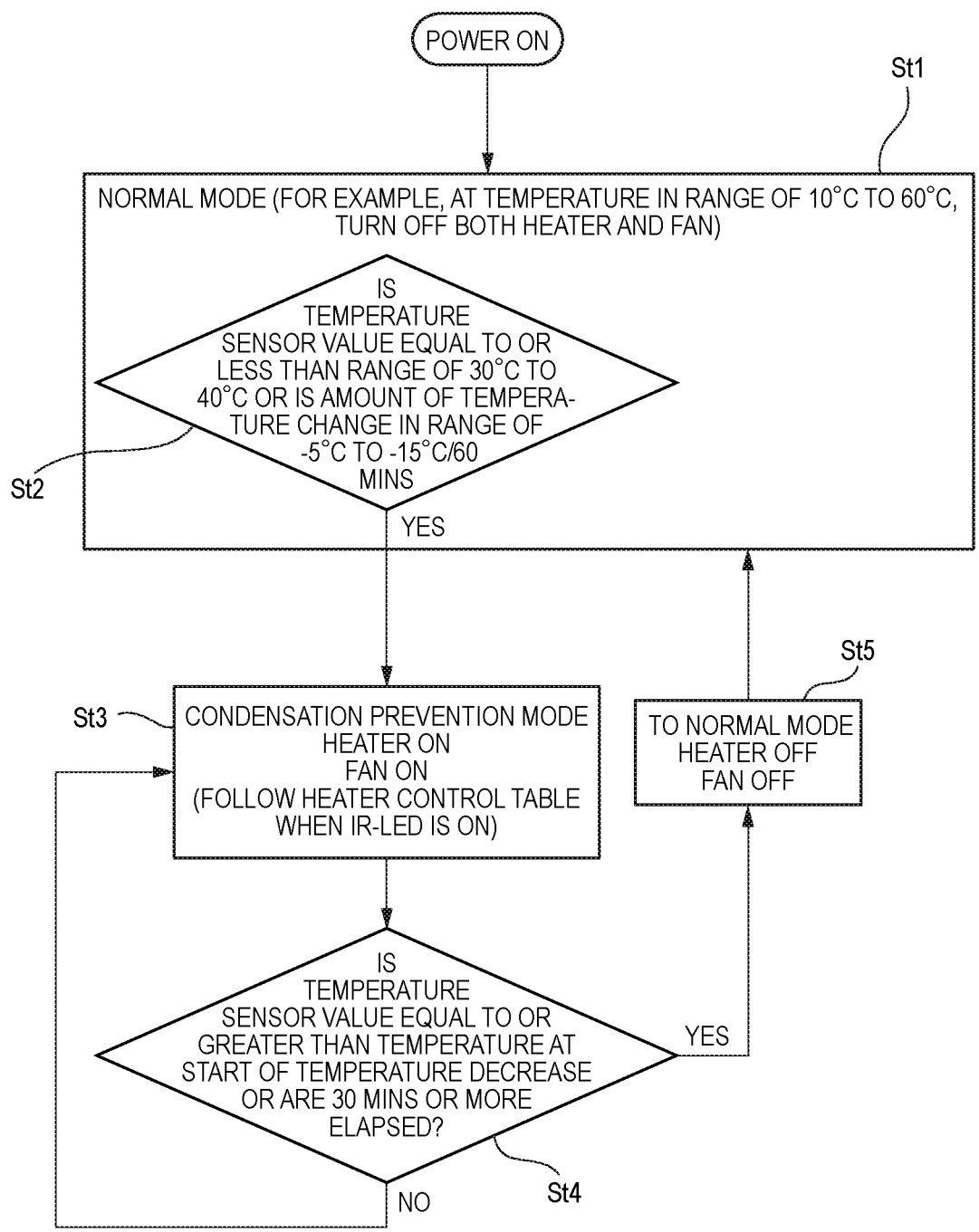
FIG. 15 is a flowchart showing an example of an operation procedure of a condensation suppressing method of the monitoring camera according to Embodiments 1 and 2.

FIG. 15 is a flowchart showing an example of an operation procedure of the condensation suppressing method of the monitoring cameras 11 and 81 according to Embodiments 1 and 2. FIG. 16 is a diagram showing an example of a heater control table. Among a processor (not shown) and a memory (not shown) constituting the controller 121, the heater control table is stored in the memory (to be described below), for example.

The processor is configured using, for example, Central Processing Unit (CPU), Micro Processing Unit (MPU), Digital Signal Processor (DSP), or Field Programmable Gate Array (FPGA). The processor serves as a part of the controller 121 of the monitoring cameras 11 and 81 and performs control processing for collectively managing the overall operations of the respective parts of the monitoring cameras 11 and 81, input/output processing of data or information between the respective parts of the monitoring cameras 11 and 81, arithmetic processing of data, and storage processing of data or information. The processor operates according to the program and data stored in the memory.

The memory is configured using a Random Access Memory (RAM) and a Read Only Memory (ROM), for example, and temporarily stores the programs and data necessary for execution of the operations of the monitoring cameras 11 and 81, as well as information or data generated during the operations. The RAM is a work memory used when the controller 121 operates, for example. For example, the ROM stores a program and data for controlling the controller 121 in advance. In addition, the ROM may hold the heater control table described above (see FIG. 16) in advance.

The condensation suppressing method of the monitoring cameras 11 and 81 involves specific control performed by the monitoring cameras 11 and 81 having the configurations shown in FIG. 14, for example.

According to the condensation suppressing method of the monitoring camera, for example, when the power supply 125 is turned on, a normal mode is activated (St1). The controller 121 stops the heater and the fan 63 to stop operating in the normal mode. For example, the temperature range in the normal mode may be 10° C. to 60° C. and may be stored in the memory in advance (see above).

In the normal mode, the controller 121 receives the measured temperature signal from the temperature sensor 119 (that is, the signal including the measured temperature value measured by the temperature sensor 119) at predetermined time intervals. That is, the controller 121 constantly monitors the temperature condition of the air around the gap 61. Generally, the controller 121 activates the heater and the fan 63 when the measured temperature value of the temperature sensor 119 is lower than a predetermined temperature value and stops the heater and the fan 63 when the temperature measured by the temperature sensor 119 is higher than the temperature measured at the start of the temperature decrease.

More specifically, when the controller 121 determines that the temperature value according to the measured temperature signal is equal to or less than the predetermined temperature value and the amount of change in the temperature value is equal to or less than the predetermined value (St2), the controller 121 then controls the condensation prevention mode (that is, the activation mode for suppressing condensation in the monitoring cameras 11 and 81) (St3). Here, the predetermined temperature value may be an any temperature value in the range of 30° C. to 40° C., for example, and may be stored in the memory (see above) in advance. In addition, the amount of change in the temperature value is a decreased temperature value within a predetermined time. The predetermined time may be 60 mins (that is, 60 minutes), and may be stored in the memory (see above) in advance, for example. The decreased temperature value may be any temperature in the range of −5° C. to −15° C. and may be stored in advance in the memory (see above).

Therefore, when the temperature value according to the measured temperature signal is decreased by 7° C. in one minute from 35° C., for example, the controller 121 activates the condensation prevention mode. As a result, the monitoring cameras 11 and 81 can suppress condensation in response to sudden changes in weather due to the surrounding outdoor environment when a downburst occurs or when a squall occurs, for example, and deterioration of the visibility of the captured image can be suppressed.

The controller 121 activates the heater and the fan 63 in the condensation prevention mode. Here, the controller 121 individually controls the activation of the first heater 41 and the second heater 43 as the IR-LEDs 55 are activated. The controller 121 individually controls the first heater 41 and the second heater 43 according to the heater control table corresponding to the current value of the IR-LEDs 55. An example of the heater control table is shown in FIG. 16. In FIG. 16, the unit of the current of the IR-LED 55 is "mA" (milliamperes). In addition, the unit of the total value of the power (that is, the power consumption by the current of the IR-LED 55), the output power of the 1.5 W heater, and the output power of the 1.2 W heater is "mW" (milliwatt), respectively.

The monitoring cameras 11 and 81 receive power supply by PoE technology through a LAN cable or the like. For this reason, the controller 121 controls by combining activations of the first heater 41 and the second heater 43 so that the total power of the first heater 41, the second heater 43, and the IR-LED 55 is about 3000 to 3500 mW or less in consideration of restrictions on the power that the PoE power supply 123 can supply.

As described above, the heater has the first heater 41, and the second heater 43 that generates a smaller amount of heat than the first heater 41. As an example, the power of the first heater 41 may be 1.5 W, for example, and the power of the second heater 43 may be 1.2 W, for example. The controller 121 controls while individually combining activation and stoppage of the first heater 41 and the second heater 43 according to the current value of the infrared light irradiation device 49.

As shown in the heater control table shown in FIG. 16, the controller 121 stops the first heater 41 and the second heater 43 when the current of the IR-LED 55 is equal to or greater than 352 mA, for example. The controller 121 activates the second heater 43 when the current of the IR-LED 55 decreases to 336 mA. The controller 121 stops the second heater 43 and activates the first heater 41 when the current of the IR-LED 55 decreases to 252 mA. The controller 121 activates both the first heater 41 and the second heater 43 when the current of the IR-LED 55 further decreases to 110 mA. With this combination control by the controller 121, the total power of the monitoring camera 11 and the monitoring camera 81 can be suppressed to about 3000 mW or less.

In FIG. 16, a downward arrow indicates a decreasing direction of the current change of the infrared light irradiation device 49, and an upward arrow indicates an increasing direction of the current change of the infrared light irradiation device 49.

The controller 121 monitors the measured temperature signal by the temperature sensor 119 in the condensation prevention mode. The controller 121 determines whether or not the temperature of the measured temperature signal has been equal to or greater than the temperature at the start of the temperature decrease and whether or not the 30 mins or more have elapsed (St4). The temperature at the start of the temperature decrease is 35° C. in the above example. Accordingly, when the temperature has been 35° C. and 30 minutes have elapsed, the controller 121 stops the heater and the fan 63 (St5) and controls to return to the normal mode.

Here, the elapsed time of 30 minutes is counted in order to prevent the activation and stoppage of the heater and the fan 63 from being repeated in a short time (so-called "short cycle"). The procedure of the condensation suppressing method of the monitoring camera has been described.

Next, the operation of the configuration of the monitoring cameras 11 and 81 according to Embodiments 1 and 2 will be described.

The monitoring cameras 11 and 81 according to Embodiments 1 and 2 have a camera unit 31 having a lens 37, a housing 17 having an opening 59 substantially coinciding with the lens 37 to support the camera unit 31, and surrounding the camera unit 31 while having a gap 61 therebetween, a light-transmissive cover 21 which is attached to the opening 59 while being spaced apart from the lens 37 and seals off the housing 17, a fan 63 which is disposed in the gap 61 and circulates the air in the gap 61 between the fan 63 and the cover 21, a ventilation hole 65 which is bored in the housing 17 and causes the gap 61 to be open to the outside 67, a water-proof air-permeable film 69 that covers the ventilation hole 65, a heater which is provided facing the gap 61 and heats the air, and an infrared light irradiation device 49 which is provided facing the gap 61 and emits the infrared light to the outside 67 through the cover 21 and radiates the heat into the air.

In the monitoring cameras 11 and 81 according to Embodiments 1 and 2, when the fan 63 is driven, air in the gap 61 circulates between the fan 63 and the cover 21. The air blown out from the fan 63 flows toward the cover 21 through the gap 61 serving as a flow path and flows along the inner surface of the cover 21 and then returns to the inlet side of the fan 63 through the other gap 61. Here, the flow path may not be strictly specified. However, it is a requirement that the air is blown out from the fan 63 and brought into contact with the inner surface of the cover 21, and then returned to the fan 63 in a reflux manner. In other words, on the inner surface of the cover 21, there is no stagnation region of air that is isolated from the air flow (so-called "circulation").

The ventilation hole 65 is bored on the inner wall surface of the housing 17 constituting the gap 61. The ventilation hole 65 permits the air to pass between the inside and outside of the housing. The ventilation hole 65 is covered with a water-proof air-permeable film 69. The water-proof air-permeable film 69 permits the air (including water vapor) to pass between inside and outside of the casing, but does not permit a liquid to pass between inside and outside of the casing. Therefore, the water vapor in the case is exhausted to the outside 67 through the water-proof air-permeable film 69, so that moisture in the case is discharged to the outside 67.

The gap 61 is provided so that the heater and the infrared light irradiation device 49 are in contact with the air in the gap 61. The heater heats the air in the gap 61. The infrared light irradiation device 49 radiates the heat generated by the activation to the air in the gap 61. That is, both the heater and the infrared light irradiation device 49 raise the air temperature in the gap 61.

Here, in the monitoring camera 11 and the monitoring camera 81 closed by the housing 17 and the cover 21, when the temperature of the external air decreases, the temperature of the housing 17 and the cover 21 decreases due to heat transfer. In addition, the temperature of the inner surface of the cover 21 decreases due to heat conduction from the outer surface. Therefore, a temperature difference occurs between the inner surface of the cover 21 and the air in the gap 61. At this time, for example, it is assumed that the temperature of the outside 67 is 20° C. and the relative humidity is 50%. The absolute humidity at this time is 0.0073 kg/kg on the psychrometric chart. In addition, it is assumed that the temperature of the air in the gap 61 is 40° C. and the relative humidity is 50% in the closed monitoring camera 11 and monitoring camera 81. The absolute humidity at this time is 0.0236 kg/kg on the psychrometric chart. The inner surface of the cover 21 has a dew point temperature of 27.5° C.

The temperature of the air 40° C. in the gap 61 gradually decreases as the heat is dissipated from the cover 21 and the housing 17 to the outside 67. If the temperature of the inner surface of the cover 21 decreases to 27.5° C., the water vapor contained in the air of the gap 61 condenses into liquid on the inner surface of the cover 21, resulting in condensation. The condensate diffusely reflects the incident light from the cover 21, degrading the captured image.

Therefore, in the monitoring cameras 11 and 81 according to Embodiments 1 and 2, when the air temperature 40° C. decreases to a predetermined temperature (for example, 35° C.), the fan 63 and the heater are activated. Here, the temperature of 40° C. is the temperature decrease start temperature. The air in the gap 61 rises from 35° C. due to the heat generated by the heater or the like. As a result of the temperature rise, the temperature of the air in the gap 61 changes back to the temperature decrease start temperature of 40° C. In the monitoring cameras 11 and 81, when the temperature of the air in the gap 61 rises to the start temperature of 40° C., the fan 63 and the heater are stopped. In effect, the air in the gap 61 is equal to or greater than 40° C. due to the control by a delay timer or the like and the delay in the transfer and conduction of heat.

At this time, the heated air blown by the fan 63 flows along the inner surface of the cover 21. That is, heat from the air is transferred to the inner surface of the cover 21 by heat transfer. As a result, the inner surface of the cover 21 does not decrease to the dew point temperature of 27.5° C., and condensation is suppressed.

Further, a water-proof air-permeable film 69 is disposed in a flow path through which air circulates between the fan 63 and the cover 21. The air in the gap 61 heated to 35° C. or higher passes through the water-proof air-permeable film 69 together with water vapor and is gradually exhausted to the outside 67. Among the flow paths through which the air circulates, the flow path through which the air blown out from the fan 63 flows toward the cover 21 is a positive pressure side by transferred energy of the air by the fan 63. On the other hand, the flow path on the return side from the cover 21 to the fan 63 is a negative pressure side. The water-proof air-permeable film 69 may be provided on the positive pressure side. When the water-proof air-permeable film 69 is provided on the positive pressure side, water vapor can be effectively exhausted to the outside 67, as compared with a case where it is provided on the negative pressure side.

The monitoring camera 11 and the monitoring camera 81 may have the ventilation hole 65 and the water-proof air-permeable film 69 that covers the ventilation hole 65 at two positions. In this case, a pair of ventilation holes 65 and water-proof air-permeable film 69 is disposed on the positive pressure side of the gap 61, and the other pair is disposed on the negative pressure side. According to the monitoring camera 11 and the monitoring camera 81 having such a configuration, the air having the high absolute humidity is permitted to be discharged to the outside 67 through the water-proof air-permeable film 69 on the positive pressure side, while the outside air having the low absolute humidity is introduced into the gap 61. As a result, the inside of the housing can be dehumidified in a shorter time.

When a certain degree of pressure decreases in the housing due to the exhaust, then outside air flows into the gap 61 through the water-proof air-permeable film 69. At this time, the absolute humidity of the air exhausted to the outside 67 is 0.0236 kg/kg as described above, and the absolute humidity of the outside air flowing into the gap 61 from the outside 67 is 0.0073 kg/kg as described above. Therefore, the dehumidification of (0.0236-0.0073) =0.0163 kg/kg is approximately achieved.

When all the air in the gap 61 is exchanged with the air in the outside 67, the air in the gap 61 in the housing has an absolute humidity of 0.0073 kg/kg at 40° C. The relative humidity at this time is 16% on the psychrometric chart. In addition, the dew point temperature is 9° C. That is, the air in the gap 61 is dehumidified (dried) to an amount of moisture which does not cause condensation unless the inner surface of the cover 21 is decreased to 9° C. Thus, it is possible to reduce the driving time of the heater for suppressing condensation.

As described above, in the monitoring cameras 11 and 81, dehumidification is performed each time the dehumidification mode is activated. The monitoring cameras 11 and 81 can suppress condensation on the cover 21 by a synergistic effect of condensation suppression by warming the inner surface of the cover 21 and dehumidification of the internal air. As a result, the deterioration of image quality due to condensate can be suppressed more effectively while suppressing the increase in the running cost.

In addition, in the related monitoring cameras, expensive dehumidifying elements are mounted for dehumidification in some cases. On the other hand, since the monitoring cameras 11 and 81 can dehumidify without using a dehumidifying element, the manufacturing cost and the running cost can be reduced as compared with the case of mounting the dehumidifying element.

Therefore, according to the monitoring camera 11, the monitoring camera 81, and the condensation suppressing method of the monitoring camera according to the present embodiment, it is possible to suppress an increase in manufacturing cost and running cost, and suppress condensation and icing while effectively utilizing internal heat generation.

In addition, the monitoring cameras 11 and 81 further have a temperature sensor 119 for measuring the temperature of the air, and a controller 121 that can individually control the activation and stoppage of the fan 63 and the heater based on a measured temperature signal from the temperature sensor 119, and current value of the infrared light irradiation device 49.

As described above, in the monitoring cameras 11 and 81, the temperature of the air circulating in the gap 61 is measured by the temperature sensor 119. The measured temperature signal from the temperature sensor 119 is input to the controller 121. In addition, the controller 121 acquires the current value of the infrared light irradiation device 49. The controller 121 can independently control the activation and the stoppage of the fan 63, and the activation and the stoppage of the heater, respectively, based on the measured temperature signals and the current value of the infrared light irradiation device 49.

In addition, in the monitoring cameras 11 and 81, the heater has a first heater 41 and a second heater 43 that generates a smaller amount of heat than the first heater 41.

As described above, in the monitoring cameras 11 and 81, the controller 121 can individually drive and control the first heater 41 and the second heater 43 that generates a smaller amount of heat than the first heater 41. The controller 121 can perform finer control by combining driving the first heater 41 only, driving the second heater 43 only, and driving the first heater 41 and the second heater 43, according to the current value of the infrared light irradiation device 49. As a result, waste of current consumption can be further reduced.

In addition, in the monitoring cameras 11 and 81, the heater is disposed on the downstream side of the infrared light irradiation device 49 in the flow path of air flowing from the fan 63 to the cover 21.

As described above, in the monitoring cameras 11 and 81, the heat generation of the heater can be efficiently supplied directly to the cover 21. As a result, condensation can be suppressed efficiently. In addition, it is not necessary to directly raise the temperature of the infrared light irradiation device 49 by the heat of the heater.

In addition, the environment where the monitoring cameras 11 and 81 are installed is outdoor.

Thus, in the monitoring cameras 11 and 81, condensation is less likely to occur in comparison with the related structure, by both the condensation suppression effect of the cover 21 due to the temperature rise and the condensation suppression effect of the cover 21 due to dehumidification. As a result, even in the outdoors where a rapid temperature change is likely to occur due to weather conditions, condensation on the cover 21 can be sufficiently suppressed, and a captured image with high clarity can be continuously acquired.

In addition, the condensation suppressing method of the monitoring cameras 11 and 81 according to Embodiments 1 and 2 is the condensation suppressing method of a monitoring camera that includes a camera unit 31 having a lens 37, a housing 17 having an opening 59 coinciding with the lens 37 to support the camera unit 31, and surrounding the camera unit 31 while having a gap 61 therebetween, a light-transmissive cover 21 which is attached to the opening 59 while being spaced apart from the lens 37 and seals off the housing 17, a fan 63 which is disposed in the gap 61 and circulates the air in the gap 61 between the fan 63 and the cover 21, a ventilation hole 65 which is bored in the housing 17 and causes the gap 61 to be open to the outside 67, a water-proof air-permeable film 69 that covers the ventilation hole 65, a heater which is provided facing the gap 61 and heats the air, an infrared light irradiation device 49 which is provided facing the gap 61 and emits the infrared light to the outside 67 through the cover 21 and radiates the heat into the air, a temperature sensor 119 that measures the temperature of the air, and a controller 121 that individually controls the activation and stoppage of the fan 63 and the heater based on the measured temperature signal from the temperature sensor 119 and the current value of the infrared light irradiation device 49, in which, the controller 121 activates the heater and the fan 63 when the temperature measured by the temperature sensor 119 is lower than a predetermined temperature, and stops the heater and the fan 63 when the temperature measured by the temperature sensor 119 is higher than the temperature at the start of the temperature decrease.

As described above, with the condensation suppressing method of the monitoring cameras 11 and 81 according to Embodiments 1 and 2, the measured temperature signal from the temperature sensor 119 is input to the controller 121. The controller 121 acquires the current value of the infrared light irradiation device 49. The controller 121 controls the activation and stoppage of the fan 63 and the heater based on these measured temperature signals and the current value of the infrared light irradiation device 49. For example, when the measured temperature signal of the temperature at which the condensation prevention mode starts is input, the controller 121 refers to the current value of the infrared light irradiation device 49. When the current value of the infrared light irradiation device 49 is large, only the fan 63 is driven, and the heater is stopped. That is, heat generation of the infrared light irradiation device 49 is used. On the other hand, when the measured temperature signal of the temperature at which the condensation prevention mode starts is input, when the current value of the infrared light irradiation device 49 is small, the fan 63 and the heater are driven. As a result, when the amount of heat for heating the air can be covered by the heat exhausted from the infrared light irradiation device 49, useless consumption current of the heater can be reduced.

In addition, with the condensation suppressing method of the monitoring cameras 11 and 81, the heater has the first heater 41, and a second heater 43 that generates a smaller amount of heat than the first heater 41. The controller 121 controls while individually combining activation and stoppage of the first heater 41 and the second heater 43 according to the current value of the infrared light irradiation device 49.

In this way, according to the condensation suppressing method of the monitoring camera, the controller 121 individually drives and controls the first heater 41 and the second heater 43 that generates a smaller amount of heat than the first heater 41. The controller 121 can perform finer control by combining driving the first heater 41 only, driving the second heater 43 only, and driving the first heater 41 and the second heater 43 according to the current value of the infrared light irradiation device 49. As a result, waste of current consumption can be further reduced.

While various embodiments have been described with reference to the drawings, it goes without saying that the present disclosure is not limited to such examples. It will be apparent to those skilled in the art that, within the scope described in the claims, can come up with various kinds of modification examples, modification examples, substitution examples, addition examples, deletion examples, and even examples, and they belong to the technical scope of this disclosure as a matter of course. In addition, within the scope not deviating from the gist of the invention, each constituent element in the various embodiments described above may be optionally combined.

The present disclosure is useful as a monitoring camera and a condensation suppressing method of the monitoring camera, capable of suppressing an increase in manufacturing cost and running cost and effectively suppressing condensation and icing by effectively utilizing internal heat generation.

The present application is based upon Japanese Patent Application (Patent Application No. 2018-074005) filed on Apr. 6, 2018, the contents of which are incorporated herein by reference.

What is claimed is:

1. A monitoring camera comprising:
    a camera unit that has a lens;
    a housing that has an opening facing a light incident surface of the lens to support the camera unit, and surrounds the camera unit with a gap, the gap formed between the housing and the camera unit;
    a light-transmissive cover that is attached to the opening with spaced apart from the lens to seal off the housing;
    a fan that is disposed in the gap and circulates an air in the gap;
    a ventilation hole that is bored in the housing and causes the gap to be open to an outside;
    a water-proof air-permeable film that covers the ventilation hole;
    a heater that is provided facing the gap and heats the air; and
    an infrared light irradiation device that is provided facing the gap and emits infrared light to the outside through the cover and radiates heat into the air.

2. The monitoring camera according to claim 1, further comprising:
    a temperature sensor that measures a temperature of the air; and
    a controller that controls activation and stoppage of the fan and the heater based on a measured temperature signal from the temperature sensor and a current value of the infrared light irradiation device.

3. The monitoring camera according to claim 1,
    wherein the heater includes a first heater, and a second heater that generates a smaller amount of heat than the first heater.

4. The monitoring camera according to claim 1,
    wherein the heater is disposed on a downstream side of the infrared light irradiation device in a flow path of the air flowing from the fan to the cover.

5. The monitoring camera according to claim 1,
    wherein an environment where the monitoring camera is installed is outdoor.

6. A method for suppressing condensation in a monitoring camera,
    the monitoring camera comprising:
        a camera unit that has a lens;
        a housing that has an opening facing a light incident surface of the lens to support the camera unit, and surrounds the camera unit with a gap, the gap formed between the housing and the camera unit;
        a light-transmissive cover that is attached to the opening with spaced apart from the lens to seal off the housing;
        a fan that is disposed in the gap and circulates an air in the gap between the fan and the cover;
        a ventilation hole that is provided in the housing and causes the gap to be open to an outside;
        a water-proof air-permeable film that covers the ventilation hole;
        a heater which is provided facing the gap and heats the air;
        an infrared light irradiation device which is provided facing the gap and emits infrared light to the outside through the cover and radiates heat into the air;
        a temperature sensor for measuring a temperature of the air; and
        a controller for controlling activation and stoppage of the fan and the heater based on a measured temperature signal from the temperature sensor and a current value of the infrared light irradiation device,
    said method comprising:
    activating, by the controller, the heater and the fan when a temperature measured by the temperature sensor is lower than a predetermined temperature; and
    stopping, by the controller, the heater and the fan when a temperature measured by the temperature sensor is higher than a temperature at a start of a temperature decrease.

7. The method for suppressing condensation in a monitoring camera according to claim 6,
    wherein the heater has a first heater, and a second heater that generates a smaller amount of heat than the first heater, and
    the controller controls activation and stoppage of the first heater and the second heater in combination, according to the current value of the infrared light irradiation device.

* * * * *